US010007485B2

(12) United States Patent
Peters et al.

(10) Patent No.: US 10,007,485 B2
(45) Date of Patent: Jun. 26, 2018

(54) ZERO-DELAY COMPRESSION FIFO BUFFER

(71) Applicant: Oracle International Corporation, Redwood Shores, CA (US)

(72) Inventors: Hagen W. Peters, Sunnyvale, CA (US); Hans Eberle, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 263 days.

(21) Appl. No.: 14/993,879

(22) Filed: Jan. 12, 2016

(65) Prior Publication Data
US 2017/0199722 A1 Jul. 13, 2017

(51) Int. Cl.
*G06F 5/06* (2006.01)
*G06F 3/06* (2006.01)

(52) U.S. Cl.
CPC ............ *G06F 5/065* (2013.01); *G06F 3/0611* (2013.01); *G06F 3/0656* (2013.01); *G06F 3/0683* (2013.01); *G06F 2205/067* (2013.01)

(58) Field of Classification Search
CPC .... G06F 3/0611; G06F 3/0656; G06F 3/0683; G06F 5/065; G06F 2205/067
See application file for complete search history.

(56) References Cited

U.S. PATENT DOCUMENTS

| 6,681,273 | B1 * | 1/2004 | Allen | G06F 5/10 710/20 |
| 2003/0023819 | A1 * | 1/2003 | Peel | G06F 5/08 711/154 |
| 2006/0004936 | A1 * | 1/2006 | Karuppampalayam | G06F 13/4059 710/62 |
| 2010/0223405 | A1 * | 9/2010 | Caltagirone | G06F 5/08 710/52 |
| 2016/0132440 | A1 * | 5/2016 | Casady | G06F 13/1673 710/308 |
| 2016/0337252 | A1 | 11/2016 | Eberle et al. | |

OTHER PUBLICATIONS

Zheng et al. "Efficient WDM Laser Sources Towards Terabyte/s Silicon Photonic Interconnects", Journal of Lightwave Technology, vol. 31, No. 24, Dec. 15, 2013.

* cited by examiner

*Primary Examiner* — Nimesh G Patel
(74) *Attorney, Agent, or Firm* — Park, Vaughan, Fleming & Dowler LLP (57) ABSTRACT

A compression first in, first out (cFIFO) that includes at least two FIFOs is described. A first FIFO is used to store instances of higher words in data entries, and a second FIFO is used to store corresponding instances of lower words in the data entries. If an instance of the higher word for a data entry has a different value than an immediately preceding stored instance of the higher word associated with at least an immediately preceding data entry which is stored in the second FIFO, memory pointers are incremented so that a subsequent instance of the higher word will be stored in the second FIFO without overwriting the instance of the higher word. Otherwise, the memory pointers are unchanged, which associates the instance of the lower word with the immediately preceding stored instance of the higher word.

20 Claims, 6 Drawing Sheets

ZERO-DELAY COMPRESSION FIFO BUFFER

BACKGROUND

Field

The present disclosure relates to a first in, first out (FIFO) buffer, and, in particular, to a compression FIFO buffer with zero delay.

Related Art

A FIFO buffer (which is henceforth referred to as a 'FIFO') organizes and manipulates data so that the oldest (first) entry or 'head' of the queue in the FIFO is processed first. Thus, during operation a FIFO exhibits first-come, first-served behavior, so that data leaves the queue in the order in which it arrived.

Figure 1:
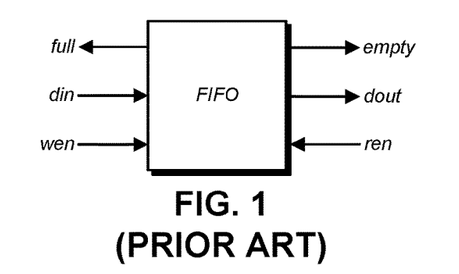
FIG. 1 is a block diagram illustrating an existing first in, first out (FIFO).

FIG. 1 presents an existing FIFO, a FIFO may be implemented using a DEPTH×WIDTH hardware FIFO. If the write-enable (wen) is set during operation of FIFO, one width-wide data word (din) is enqueued. Moreover, if the read-enable (ren) is set, a width-wide data word (dout) is dequeued. Furthermore, the signal empty indicates that the FIFO queue is empty, and the signal full indicates that the FIFO queue already holds depth data words and there is no memory space left to store more data.

However, in many applications as little delay as possible is desired for when the data is read from or written to memory. This can make it difficult to compress and decompress the data stored in a FIFO.

Hence, what is needed is a FIFO without the above-described problems.

SUMMARY

One embodiment of the present disclosure relates to a data buffer. This data buffer includes: a first memory queue; a second memory queue; a third memory queue; and control logic. During operation, the control logic receives data entries, where a given data entry includes an instance of an higher word and an instance of a lower word as specified by a word length. Then, the control logic stores the instance of the lower word in the first memory queue at a location specified by a first memory pointer. Moreover, the control logic stores the instance of the higher word in the second memory queue at a location specified by a second memory pointer, and stores an instance of the first memory pointer in the third memory queue at a location specified by a third memory pointer. Furthermore, the control logic determines if the instance of the higher word includes a different value than an immediately preceding stored instance of the higher word associated with at least an immediately preceding data entry, which is stored in the second memory queue. When the instance of the higher word includes the different value, the control logic increments the second memory pointer and the third memory pointer so that a subsequent instance of the higher word will be stored in the second memory queue without overwriting the instance of the higher word and the first memory pointer will be stored in the third memory queue without overwriting the instance of the first memory pointer. Otherwise, the control logic leaves the second memory pointer and the third memory pointer unchanged, which associates the instance of the lower word with the immediately preceding stored instance of the higher word.

Note that the data buffer includes a first-in, first-out (FIFO) data buffer. For example, the first memory queue may include a first FIFO, the second memory queue may include a second FIFO, and the third memory queue may include a third FIFO.

Moreover, the word length may be predefined. For example, the word length may maximize compression of the data entries.

Furthermore, instances of the higher word and the lower word may be stored in the data buffer for each clock cycle.

In some embodiments, the data entries include time-stamps.

Additionally, the control logic may parse the data entries into instances of higher words and instances of lower words based on the word length.

Another embodiment provides a system including: a processor; and the data buffer coupled to the processor.

Another embodiment provides a method for compressing data entries, which may be performed by the data buffer. During the method, the data buffer receives the data entries, where the given data entry includes the instance of the higher word and the instance of the lower word as specified by the word length. Then, the data buffer stores the instance of the lower word in the first memory queue at a location specified by a first memory pointer. Moreover, the data buffer stores the instance of the higher word in the second memory queue at a location specified by a second memory pointer. Furthermore, the data buffer stores an instance of the first memory pointer in a third memory queue at a location specified by a third memory pointer. Next, the data buffer determines if the instance of the higher word includes a different value than an immediately preceding stored instance of the higher word associated with at least an immediately preceding data entry, which is stored in the second memory queue. When the instance of the higher word includes the different value, the data buffer increments the second memory pointer and the third memory pointer so that a subsequent instance of the higher word will be stored in the second memory queue without overwriting the instance of the higher word and the first memory pointer will be stored in the third memory queue without overwriting the instance of the first memory pointer. Otherwise, the data buffer leaves the second memory pointer and the third memory pointer unchanged, which associates the instance of the lower word with the immediately preceding stored instance of the upper word.

BRIEF DESCRIPTION OF THE FIGURES

Table 1 provides pseudocode used to enqueue data in the cFIFO of FIG. 2 in accordance with an embodiment of the present disclosure.

Table 2 provides pseudocode used to dequeue data in the cFIFO of FIG. 2 in accordance with an embodiment of the present disclosure.

Table 3 provides memory consumption as a function of WIDTHHI in an existing FIFO and in the cFIFO of FIG. 2 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of a compression first in, first out buffer or cFIFO, a system that includes the cFIFO, and a method for compressing data entries are described. This cFIFO leverages knowledge about redundant information in the data to avoid storing the redundant information and, thus, to reduce the memory footprint of the cFIFO. In addition, the cFIFO has zero-delay compression when data is written into the cFIFO queue and zero-delay decompression when data is read from the cFIFO queue. In particular, the cFIFO may include at least two FIFOs, a first FIFO that is used to store instances of higher words in data entries, and a second FIFO that is used to store corresponding instances of lower words in the data entries. If an instance of the higher word for a data entry has a different value than an immediately preceding stored instance of the higher word associated with or related to at least an immediately preceding data entry which is stored in the second FIFO, memory pointers are incremented so that a subsequent instance of the higher word will be stored in the second memory queue without overwriting the instance of the higher word. Otherwise, the memory pointers are unchanged, which associates the instance of the lower word with the immediately preceding stored instance of the upper word.

By leveraging the knowledge about the redundant information, the cFIFO may not have increased delay (and, more significantly, no delay is added in the critical path to and from memory) and may have a significantly smaller memory footprint than existing cFIFOs.

We now describe embodiments of a data buffer, such as a cFIFO. In many applications, subsequent elements in data sequences enqueued to a FIFO queue are not completely independent. For example, subsequent sensor data readings or measurements from sensors (such as velocity, temperature, altitude, etc.) may be related, e.g., subsequent readings may not differ by very much from previous readings. However, in other applications the relationships may be even stronger. In particular, if a FIFO is used to store running counters or timestamps, the data sequence enqueued to the FIFO may actually be (piecewise) monotonic. In such cases, a FIFO implementation without compression will store a lot of redundant data in memory.

The cFIFO described below leverages additional knowledge about the nature of the data sequence to reduce the amount of redundant data stored in memory and to reduce the memory footprint of the cFIFO. The inputs to and outputs from this cFIFO are similar to those in existing FIFOs. However, in addition to having the reduced memory footprint, the cFIFO does not add delay to enqueue and dequeue operations. Note that, in general, a cFIFO performs compression on data in a FIFO to overcome the limitations imposed by constrained resources, such as the memory size for the queue.

Figure 2:
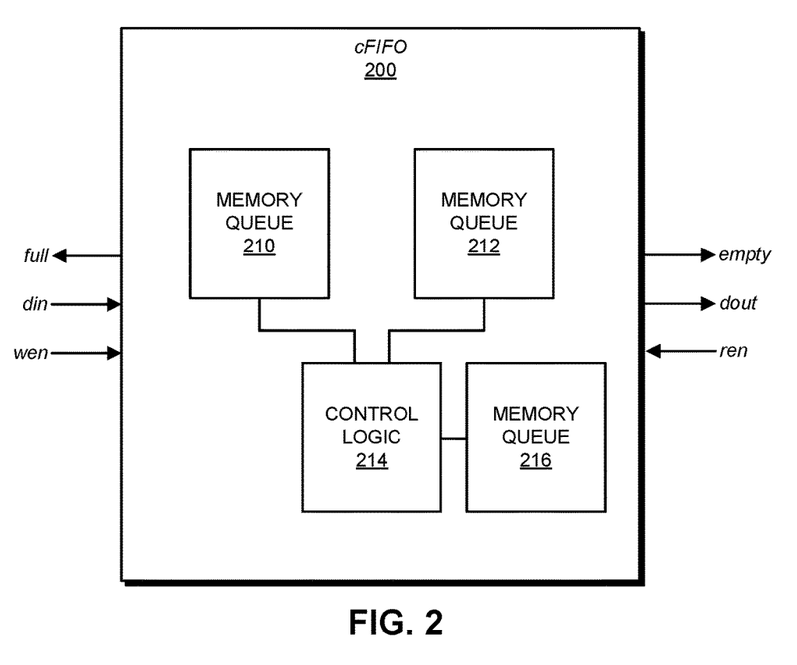
FIG. 2 is a block diagram illustrating a cFIFO in accordance with an embodiment of the present disclosure.

FIG. 2 presents a block diagram of cFIFO 200 (and, more generally, a data buffer). This cFIFO includes a memory queue 210 (such as a FIFO) and a memory queue 212 (such as a FIFO). In addition, cFIFO 200 includes control logic 214 and memory queue 216. During operation, control logic 214 receives data entries, where a given data entry includes an instance of an higher word and an instance of a lower word as specified by a word length. Then, control logic 214 stores the instance of the lower word in memory queue 210 at a location specified by a first memory pointer. Moreover, control logic 214 stores the instance of the higher word in memory queue 212 at a location specified by a second memory pointer. Next, control logic 214 stores an instance of the first memory pointer in memory queue 216 at a location specified by a third memory pointer. Furthermore, control logic 216 determines if the instance of the higher word includes a different value than an immediately preceding stored instance of the higher word associated with at least an immediately preceding data entry, which is stored in memory queue 212. When the instance of the higher word includes the different value, control logic 214 increments the second memory pointer and the third memory pointer so that a subsequent instance of the higher word will be stored in memory queue 212 without overwriting the instance of the higher word and the first memory pointer will be stored in memory queue 216 without overwriting the instance of the first memory pointer. Otherwise, control logic 214 leaves the second memory pointer and the third memory pointer unchanged, which associates the instance of the lower word with the immediately preceding stored instance of the higher word Note that the word length may be predefined. For example, the word length may maximize compression of the data entries. For a hardware implementation of cFIFO 200, the word length is set at tape out or when synthesizing the hardware. Alternatively, if cFIFO 200 is implemented in software, this parameter may be set at compile time or startup time. Moreover, control logic 214 may parse the data entries into instances of higher words and instances of lower words based on the word length. Thus, in some embodiments control logic 214 implements dynamic parsing or sizing.

Furthermore, instances of the higher word and the lower word may be stored in cFIFO 200 for each clock cycle (i.e., cFIFO 200 may have zero additional delay). In particular, control logic 214 may not impact a critical path when data is written into memory queues 210 and/or 212. Instead, one or more previously stored instances of the higher word and/or one or more memory pointers may be overwritten subsequently (such as during the next write operation).

As noted previously and described further below, cFIFO 200 may leverage knowledge about redundant information in the data entries to significantly reduce the amount of memory (such as memory 212) used in cFIFO 200. For example, the data entries may include timestamps.

In an exemplary embodiment, the cFIFO is designed for use in a network message rate limiter that has a sliding-window history. In this application, the sliding window history may be implemented with a FIFO queue. This FIFO queue may be used to store a timestamp for each of the incoming messages. The precision of the timestamps may be such that all the timestamps in the sliding window are pairwise unique. However, the timestamp values may wrap, i.e., the data sequence $d_1, \ldots, d_n$ in the sliding window may be either monotonic or may include up to two monotonic pieces $d_1, \ldots d_i$ and $d_{i+1}, \ldots d_n$ with $1 \leq i < n$. In some embodiments of the cFIFO, the limited availability of memory constrains the depth of the history and, thus, the size of the sliding window.

Many typical DEPTH×WIDTH FIFO queue implementations use a memory (e.g., with head/tail pointers) that can hold DEPTH words of width WIDTH, i.e., the FIFO consumes DEPTH×WIDTH bits in memory. In the DEPTH× WIDTH implementation of the cFIFO, a data word w may be internally treated as two words, a high-order word whi and a low-order word wlo. A third parameter of the cFIFO, DEPTHHI, may define how an input word w is split into whi and wlo. In particular, $w[\text{WIDTH}-1:0]=whi \cdot wlo,$ $whi=w[\text{WIDTH}-1:\text{WIDTH}-\text{WIDTHHI}],$ and $wlo=w[\text{WIDTH}-\text{WIDTHHI}-1:0].$ As noted previously, in many applications the difference of the values of subsequent data words is likely to be small. Therefore, the high-order portions of many subsequent words may be equal (and, thus, assume values that exhibit redundancy in the high-order bits). Based on this, the idea of the cFIFO is to virtually partition the data word sequence S in the FIFO queue into subsequences, so that all data words in a subsequence have the same high-order word. In particular, $S=S_1 \cdot S_2 \ldots \cdot S_n,$ $S_i=w_{i,1}, \ldots w_{i,len(i)},$ where $i$ is between 1 and $n$, and $\forall a=w_{i,j}, b=w_{i,k}, 1 \leq j \leq k \leq len(i): a \cdot hi = b \cdot hi.$ Having this partition, it may not be necessary to store the high-order word of all data words in a subsequence. Instead, the cFIFO may store only one high-order word for an entire subsequence. Consequently, the total memory consumption of a DEPTH×WIDTH cFIFO can be significantly less than DEPTH×WIDTH bits. Thus, when using the cFIFO, the sliding window history in the above-mentioned rate-limiter implementation may be larger given a fixed amount of memory.

Note that the partial words whi and wlo may be stored in two internal FIFOs, Hi and Lo (which may be implemented as memories with head and tail pointers, such as memory queues 210 and 212 in FIG. 2). Every enqueue operation in the cFIFO may write the respective low-order word wlo into memory Lo. Consequently, the depth of the internal FIFO Lo may be the same as the depth of the cFIFO, i.e., DEPTH. The width of memory Lo may equal the width of the low-order words, i.e., WIDTH−WIDTHHI. However, the high-order word whi may only be stored if it is different from the previously stored high-order word. Thus, the depth DEPTHHI of memory Hi may be the maximum number of pairs of subsequent timestamps in the sliding window that differ in their high-order words. In many applications, DEPTHHI is significantly smaller than DEPTH. Note that the width of memory Hi is WIDTHHI.

In addition to Hi and Lo, the cFIFO may use an optional third FIFO Idx (which also may be implemented as memory with head/tail pointers), which is used to store the partition map of the data sequence, i.e., start and end indices of all subsequences. (However, in other embodiments a portion of Hi and/or Lo may be used to store the partition map.) Therefore, the enqueue operation may store the current head-pointer for Lo in Idx whenever a new high-order word is added to Hi. Note that the depth of memory Idx may be the same as that of memory Hi, i.e., DEPTHHI. Because the values in Idx are indices in the Lo memory, the width of the values in Idx may depend logarithmically on DEPTH. As described further below, the information in Idx may be used later in the dequeue operation to do the decompression, i.e., to return the correct high-order word for a specific low-order word.

Table 1 provides pseudocode that is used to enqueue data to the cFIFO queue. Moreover, Table 2 provides pseudocode that is used to dequeue data from the cFIFO queue. In order to simplify the pseudocode, we do not consider that pointers can wrap around, and we do not show the implementation of the empty and full signals. In both the enqueue and the dequeue operations, note that reads and writes to the internal memories Lo, Hi and Idx (the index memory) may be executed unconditionally. Therefore, the cFIFO may not add delay to the memory fetch operation. Consequently, the cFIFO may have the same latency characteristics for both enqueue and dequeue as an uncompressed FIFO.

TABLE 1

| | |
|---|---|
| enqueue (value x): | |
| Lo[Lo.head] = x.lo | // x.lo, x.hi and Lo.head are always written |
| Hi[Hi.head] = x.hi | // to memory; however, the values are not valid |
| Idx[Idx.head] = Lo.head | // unless the respective head-pointers are incremented |
| if (Lo.head == Lo.tail) | // queue is empty, start a new subsequence |
| begin | |
|    Hi.tail = Hi.head | // restore initial state |
|    Hi.head ++ | // store x.hi in Hi[Hi.head] |
|    Hi.last = x.hi | //... and in Hi.last |
| end else | // queue is not empty |
| begin | |
|    if x.hi != Hi.last | // did the high-order word change (i.e., begin of next subsequence)? |
|    begin | |
|       Idx.head ++ | // store Lo.head in Idx[Idx.head] |
|       Hi.head ++ | // store x.hi in Hi[Hi.head] |
|       Hi.last = x.hi | // store x.hi in Hi.last |
|    end | |
| end | |
| Lo.head ++ | // Always store x.lo in Lo[Lo.head] |

TABLE 2

| | |
|---|---|
| dequeue ( ): | |
| result = concat (Hi[Hi.tail ], Lo[Lo.tail ]) | // always return Hi[Hi.tail], Lo[Lo.tail] |
| Lo. tail ++ | // always remove the recently returned // value |
| if (Idx.tail != Idx.head) | // valid value in Idx? |
| begin | |
|    if (Lo.tail >= Idx [Idx.tail ]) | // start of next subsequence ? |
|    begin | |
|       Hi.tail = Hi.tail + 1 | // go to next high-order word |
|       Idx.tail = Idx.tail + 1 | // go to next subsequence |
|    end | |
| end | |
| return result | |

Figure 3:
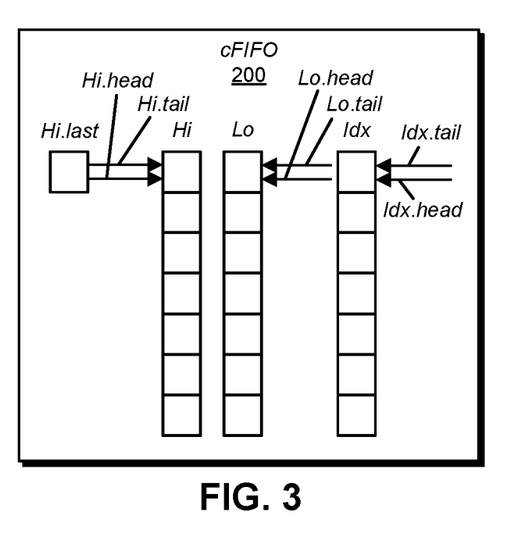
FIG. 3 is a drawing illustrating an initial state of the cFIFO of FIG. 2 in accordance with an embodiment of the present disclosure.
Figure 4:
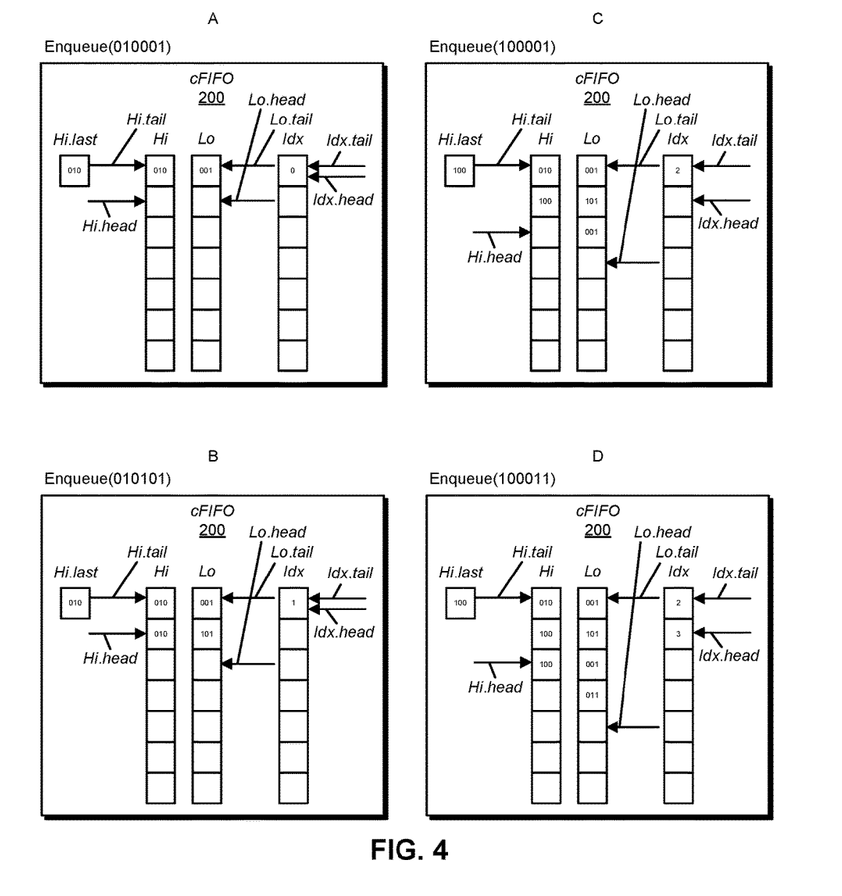
FIG. 4 is a drawing illustrating an enqueue operation in the cFIFO of FIG. 2 in accordance with an embodiment of the present disclosure.
Figure 5:
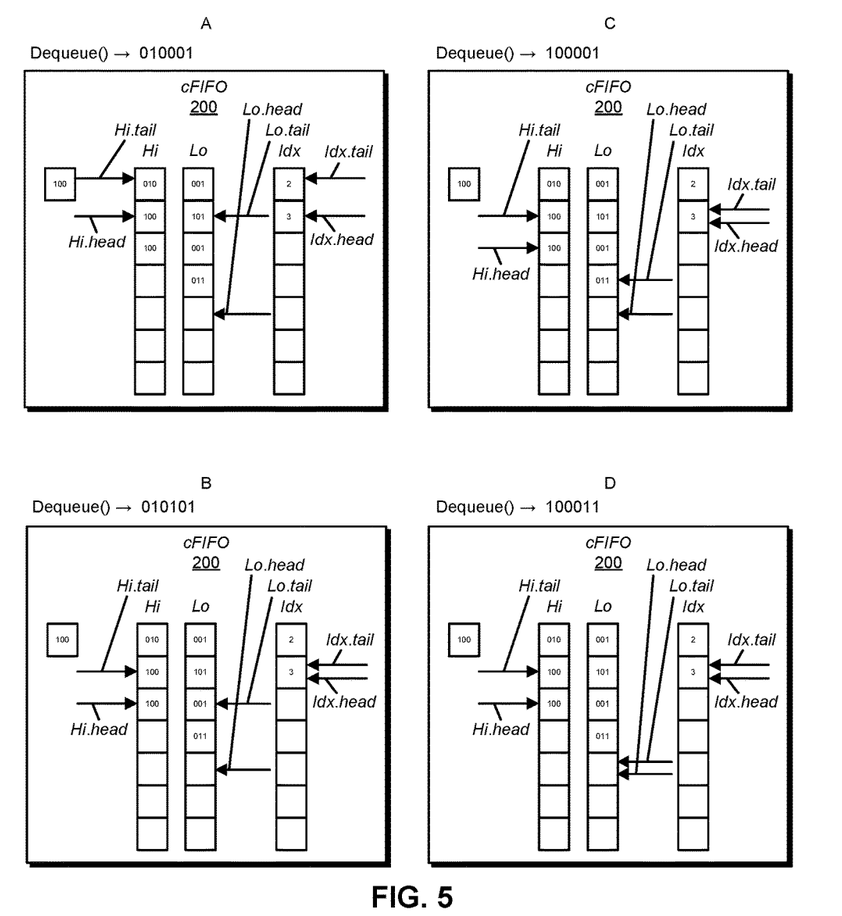
FIG. 5 is a drawing illustrating a dequeue operation in the cFIFO of FIG. 2 in accordance with an embodiment of the present disclosure.

FIG. 3 presents a drawing illustrating an initial state of cFIFO 200. Moreover, an example of enqueue and dequeue operations is presented in FIG. 4, which presents a drawing illustrating an enqueue operation in cFIFO 200, and FIG. 5, which presents a drawing illustrating a dequeue operation in cFIFO 200. As shown in FIG. 4, if Lo.tail pointer is equal to index, index is unchanged. In this way, index may point to a location in Lo and may indicate when the next instance of the higher word is used from Hi (i.e., when the higher word changes value)

Note that the memory capacity needed to implement an uncompressed WIDTH×DEPTH FIFO is $M_F$=WIDTH·DEPTH. In contrast, the memory capacity needed to implement a WIDTH×DEPTH cFIFO is the sizes of the three memories, Hi, Lo and Idx, i.e., $M_{CF}=M_{Lo}+M_{Hi}+M_{Idx}$ or (WIDTH−WIDTHHI)·DEPTH+
WIDTHHI·DEPTHHI+
(log$_2$(DEPTH))·DEPTHHI.

As noted previously, in some embodiments the data words written into the cFIFO are timestamps, i.e., the values are monotonically increasing and unique. Therefore, the size DEPTHHI of memory Hi, i.e., the maximum number of pairs of subsequent timestamps that differ in the high-order word, may equal the total number of different high-order words

DEPTHHI=$2^{WIDTHHI}$.

In a first example, consider a comparison of the memory consumption of a WIDTH×DEPTH FIFO and a WIDTH×DEPTH cFIFO. In a simple case, the size of the sliding window DEPTH exactly matches the width of the timestamps

DEPTH=$2^{WIDTH}$.

In this case, the memory capacity $M_F$ needed for an uncompressed FIFO is

WIDTH·$2^{WIDTH}$, and the memory capacity $M_{CF}$ needed for the cFIFO is (WIDTH−WIDTHHI)·DEPTH+
WIDTHHI·DEPTHHI+
(log$_2$(DEPTH))·DEPTHHI, which equals (WIDTH−WIDTHHI)·$2^{WIDTH}$+(WIDTH+
WIDTHHI)·$2^{WIDTH}$.

As shown in Table 3, which provides the memory consumption based on the preceding equations for both an uncompressed FIFO ($M_F$) and the cFIFO ($M_{CF}$) with WIDTH equal to 20 and WIDTHHI between 1 and 19, for WIDTHHI equal to 15 the cFIFO only consumes about 30% of the memory of an uncompressed FIFO.

TABLE 3

| WIDTHHI | $M_{CF}$ | $M_F$ | $M_{CF}/M_F$ |
| --- | --- | --- | --- |
| 1 | 19922986 | 20971520 | 0.95 |
| 2 | 18874456 | 20971520 | 0.9 |
| 3 | 17825976 | 20971520 | 0.85 |
| 4 | 16777600 | 20971520 | 0.8 |
| 5 | 15729440 | 20971520 | 0.75 |
| 6 | 14681728 | 20971520 | 0.7 |
| 7 | 13634944 | 20971520 | 0.65 |
| 8 | 12590080 | 20971520 | 0.6 |
| 9 | 11549184 | 20971520 | 0.55 |
| 10 | 10516480 | 20971520 | 0.501 |
| 11 | 9500672 | 20971520 | 0.453 |
| 12 | 8519680 | 20971520 | 0.406 |
| 13 | 7610368 | 20971520 | 0.362 |
| 14 | 6848512 | 20971520 | 0.326 |
| 15 | 6389760 | 20971520 | 0.304 |
| 16 | 6553600 | 20971520 | 0.312 |
| 17 | 7995392 | 20971520 | 0.381 |
| 18 | 12058624 | 20971520 | 0.575 |
| 19 | 21495808 | 20971520 | 1.025 |

In a second example, which may be a more real-world case, the actual depth of a FIFO may be constrained by the amount of available memory. In the following discussion, the available memory capacity is taken to be 1000 Kbit and the WIDTH is 20. Given these values, the depth of an uncompressed FIFO is at most 1000 Kbit divided by 20 bits or 50,000.

As in the previous example, all data words in the sliding window may be unique and the sequence of data words may be monotonically increasing. However, because DEPTH may be smaller than $2^{WIDTHHI}$, DEPTHHI may be the minimum of DEPTH and $2^{WIDTHHI}$. In this case, the memory capacity $M_{CF}$ needed for the cFIFO may be (WIDTH−WIDTHHI)·DEPTH+
WIDTHHI·min{DEPTH,$2^{WIDTHHI}$}+(log$_2$
(DEPTH))·min{DEPTH,$2^{WIDTHHI}$}.

For DEPTH ranging from 90,000 to 120,000 and WIDTHHI ranging from 9 to 14, this equation indicates that $M_{CF}$ ranges from 840 to 1330 Kbits. For example, for WIDTHHI equal to 12 and DEPTH equal to 110,000, the cFIFO fits into the 1000 Kbit memory. This means that the DEPTH of the cFIFO can be more than twice the depth of an uncompressed FIFO.

In the cFIFO, the high-order words may represent larger numerical values. However, that is not a requirement for the cFIFO to work. Note that the cFIFO does not perform any arithmetic operation on the data word. Instead, the only operation is a 'compare for equality'. Thus, the so-called 'high-order word' may, in fact, be any subset of bits of the original data word rather than the high-order bits.

Furthermore, because Hi, Lo and Idx may be implemented as FIFOs, the cFIFO may be further optimized by recursively applying the concept to Hi, Lo and Idx, i.e., by implementing Hi, Lo and Idx as cFIFOs as well.

In the history-based rate-limiter application, the cFIFO may be used to store a history of timestamps. As discussed in the aforementioned first example, the cFIFO may consume up to 70% less memory than an uncompressed FIFO. However, in practice there may only be a few different memory depths and widths from which to choose. In the second example described previously, the optimal value for WIDTHHI may be 11, i.e., the width of the Hi memory may be 11 and the width of the Lo memory may be 9. If these memory sizes are unavailable, a WIDTHHI of 10 may be used, i.e., both the width of the Lo and Hi memories may be 10.

Note that the compression ratio of the cFIFO may depend on the data characteristics of the application. Embodiments in which the cFIFO holds piecewise monotonic data sequences with unique data items (such as timestamps, counters, sequence numbers, etc.) may be optimal for the cFIFO. However, as noted previously, the monotonicity of the data sequence is not a requirement. In the case of data entries that include timestamps, monotonicity allows DEPTHHI, the maximum number of subsequent pairs of timestamps with different high-order words, to be determined. More generally, the cFIFO can be used effectively in use cases in which DEPTHHI can be determined, based on theoretical analysis and/or based on empirical data. Thus, other use cases for the cFIFO may involve data entries that include sensor data, such as: velocity, altitude, temperature, etc.

Additionally, while memory Idx was used to store the start and end indices in the preceding discussion, in other embodiments the start and end indices of subsequences may be stored in memory Lo. Alternatively, the cFIFO may add a 1-bit flag to every data word in memory Lo in order to indicate where one subsequence ends and the next subsequence begins.

Referring back to Table 2, in the dequeue operation a concatenation of the values at the tail positions in the upper-word memory and the lower-word memory is returned. Moreover, the tail pointer of the lower-word memory may always be incremented. Then, the dequeue operations may check if the next subsequence has started. If yes, both the upper-word memory tail pointer and the index-memory tail pointer may also be incremented.

Figure 6:
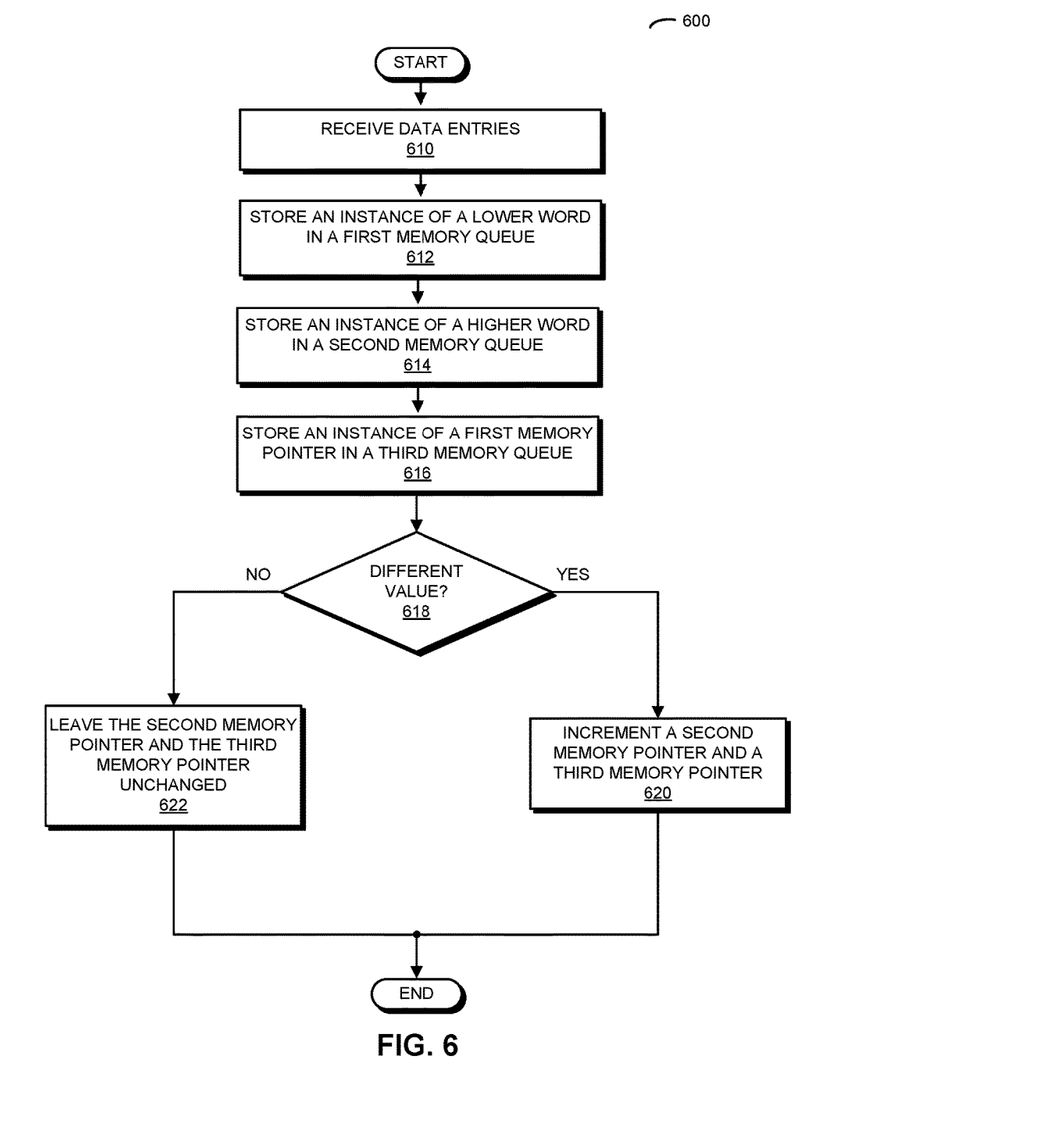
FIG. 6 is a method for compressing data entries in the cFIFO of FIG. 2 in accordance with an embodiment of the present disclosure.

We now describe embodiments of the method. FIG. 6 presents a method 600 for compressing data entries that may be performed by a data buffer, such as cFIFO 200 in FIG. 2. During operation, the data buffer receives data entries (operation 610), where a given data entry includes an instance of an higher word and an instance of a lower word as specified by a word length. Then, the data buffer stores the instance of the lower word in a first memory queue (such as a first FIFO) (operation 612) in the data buffer at a location specified by a first memory pointer. Moreover, the data buffer stores the instance of the higher word in a second memory queue (such as a second FIFO) (operation 614) in the data buffer at a location specified by a second memory pointer. Furthermore, the data buffer stores an instance of the first memory pointer in a third memory queue (operation 616) at a location specified by a third memory pointer. Next, the data buffer determines if the instance of the higher word includes a different value (operation 618) than an immediately preceding stored instance of the higher word associated with at least an immediately preceding data entry, which is stored in the second memory queue. When the instance of the higher word includes the different value (operation 618), the data buffer increments the second memory pointer and the third memory pointer (operation 620) so that a subsequent instance of the higher word will be stored in the second memory queue without overwriting the instance of the higher word and the first memory pointer will be stored in the third memory queue without overwriting the instance of the first memory pointer. Otherwise (operation 618), the data buffer leaves the second memory pointer and the third memory pointer unchanged (operation 622), which associates the instance of the lower word with the immediately preceding stored instance of the upper word.

In some embodiments of method 600, there are additional or fewer operations. Moreover, the order of the operations may be changed and/or two or more operations may be combined into a single operation.

Figure 7:
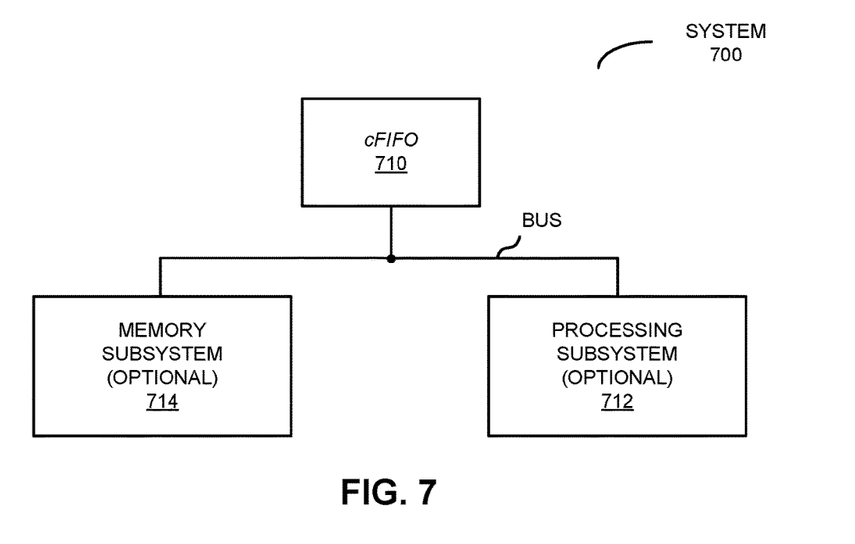
FIG. 7 is a block diagram illustrating a system that includes the cFIFO of FIG. 2 in accordance with an embodiment of the present disclosure.

We now describe embodiments of the system. FIG. 7 presents a block diagram of a system 700 that includes cFIFO 710, which may be one of the preceding embodiments of the cFIFO (such as cFIFO 200 in FIG. 2). Furthermore, system 700 may include one or more program modules or sets of instructions stored in an optional memory subsystem 714 (such as DRAM, another type of volatile or non-volatile computer-readable memory, and more generally a memory), which may be executed by an optional processing subsystem 712 (which may include one or more processors). Note that the one or more computer programs may constitute a computer-program mechanism. Furthermore, instructions in the various modules in optional memory subsystem 714 may be implemented in: a high-level procedural language, an object-oriented programming language, and/or in an assembly or machine language. Note that the programming language may be compiled or interpreted, e.g., configurable or configured, to be executed by optional processing subsystem 712.

More generally, embodiments of the cFIFO may be used in a variety of applications, including communications, high-performance computing, etc. As a consequence, the system may include: VLSI circuits, communication systems, storage area networks, data centers, networks (such as local area networks), and/or computer systems (such as multiple-core processor computer systems). Note that system 700 may include, but is not limited to: a server (such as a multi-socket, multi-rack server), a laptop computer, a communication device or system, a tablet computer, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Moreover, note that a given computer system may be at one location or may be distributed over multiple, geographically dispersed locations.

The preceding embodiments may include fewer components or additional components. Although these embodiments are illustrated as having a number of discrete items, these circuits and devices are intended to be functional descriptions of the various features that may be present rather than structural schematics of the embodiments described herein. Consequently, in these embodiments two or more components may be combined into a single component, and/or a position of one or more components may be changed.

Furthermore, functionality in these circuits, components and devices is implemented in hardware and/or in software as is known in the art. For example, some or all of the functionality of these embodiments may be implemented in one or more: application-specific integrated circuits (ASICs), field-programmable gate arrays (FPGAs), and/or one or more digital signal processors (DSPs). Additionally, note that circuits in these embodiments may be implemented using PMOS and/or NMOS, and signals may include digital signals that have approximately discrete values and/or analog signals that have continuous values. Note that components and circuits may be single-ended or differential, and power supplies may be unipolar or bipolar.

In the preceding embodiments, some components are shown directly connected to one another, while others are shown connected via intermediate components. In each instance the method of interconnection, or 'coupling,' establishes some desired electrical communication between two or more circuit nodes, or terminals. Such coupling may often be accomplished using a number of circuit configurations, as will be understood by those of skill in the art (for example, AC coupling and/or DC coupling may be used).

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in: Caltech Intermediate Format (CIF), Calma GDSII Stream Format (GDSII) or Electronic Design Interchange Format (EDIF). Those of skill in the art of integrated circuit design can develop such data structures from schematics of the type detailed above and the corresponding descriptions and encode the data structures on a computer-readable medium. Those of skill in the art of integrated circuit fabrication can use such encoded data to fabricate integrated circuits comprising one or more of the circuits described herein.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A data buffer, implemented in hardware, comprising:
   a first memory queue;
   a second memory queue;
   a third memory queue; and
   control logic configured to:
   receive data entries, wherein a given data entry includes an instance of an higher word and an instance of a lower word as specified by a word length;
   store the instance of the lower word in the first memory queue at a location specified by a first memory pointer;
   store the instance of the higher word at in the second memory queue at a location specified by a second memory pointer;
   store an instance of the first memory pointer in the third memory queue at a location specified by a third memory pointer;
   determine if the instance of the higher word includes a different value than an immediately preceding stored instance of the higher word associated with at least an immediately preceding data entry, which is stored in the second memory queue;
   when the instance of the higher word includes the different value, increment the second memory pointer and the third memory pointer so that a subsequent instance of the higher word will be stored in the second memory queue without overwriting the instance of the higher word and the first memory pointer will be stored in the third memory queue without overwriting the instance of the first memory pointer; and
   otherwise, leave the second memory pointer and the third memory pointer unchanged, which associates the instance of the lower word with the immediately preceding stored instance of the upper word.

2. The data buffer of claim 1, wherein the data buffer includes a first-in, first-out (FIFO) data buffer.

3. The data buffer of claim 1, wherein the first memory queue includes a first FIFO;
   wherein the second memory queue includes a second FIFO; and
   wherein the third memory queue includes a third FIFO.

4. The data buffer of claim 1, wherein the word length is predefined.

5. The data buffer of claim 4, wherein the word length maximizes compression of the data entries.

6. The data buffer of claim 1, wherein instances of the higher word and the lower word are stored in the data buffer for each clock cycle.

7. The data buffer of claim 1, wherein the data entries include timestamps.

8. The data buffer of claim 1, wherein the control logic is further configured to parse the data entries into instances of higher words and instances of lower words based on the word length.

9. A system, comprising:
   a processor; and
   a data buffer, implemented in hardware and coupled to the processor, wherein the data buffer includes:
   a first memory queue;
   a second memory queue;
   a third memory queue; and
   control logic configured to:
   receive data entries, wherein a given data entry includes an instance of an higher word and an instance of a lower word as specified by a word length;
   store the instance of the lower word in the first memory queue at a location specified by a first memory pointer;
   store the instance of the higher word at in the second memory queue at a location specified by a second memory pointer;
   store an instance of the first memory pointer in the third memory queue at a location specified by a third memory pointer;
   determine if the instance of the higher word includes a different value than an immediately preceding stored instance of the higher word associated with at least an immediately preceding data entry, which is stored in the second memory queue;
   when the instance of the higher word includes the different value, increment the second memory pointer and the third memory pointer so that a subsequent instance of the higher word will be stored in the second memory queue without overwriting the instance of the higher word and the first memory pointer will be stored in the third memory queue without overwriting the instance of the first memory pointer; and
   otherwise, leave the second memory pointer and the third memory pointer unchanged, which associates the instance of the lower word with the immediately preceding stored instance of the upper word.

10. The system of claim 9, wherein the data buffer includes a first-in, first-out (FIFO) data buffer.

11. The system of claim 9, wherein the first memory queue includes a first FIFO;
    wherein the second memory queue includes a second FIFO; and
    wherein the third memory queue includes a third FIFO.

12. The system of claim 9, wherein the word length is predefined.

13. The system of claim 12, wherein the word length maximizes compression of the data entries.

14. The system of claim 9, wherein instances of the higher word and the lower word are stored in the data buffer for each clock cycle.

15. The system of claim 9, wherein the data entries include timestamps.

16. A method for compressing data entries, wherein the method comprises:

receiving, via hardware, the data entries, wherein a given data entry includes an instance of an higher word and an instance of a lower word as specified by a word length;

storing, via hardware, the instance of the lower word in a first memory queue at a location specified by a first memory pointer;

storing, via hardware, the instance of the higher word at in a second memory queue at a location specified by a second memory pointer;

storing, via hardware, an instance of the first memory pointer in a third memory queue at a location specified by a third memory pointer;

determining, via hardware, if the instance of the higher word includes a different value than an immediately preceding stored instance of the higher word associated with at least an immediately preceding data entry, which is stored in the second memory queue;

when the instance of the higher word includes the different value, incrementing, via hardware, the second memory pointer and the third memory pointer so that a subsequent instance of the higher word will be stored in the second memory queue without overwriting the instance of the higher word and the first memory pointer will be stored in the third memory queue without overwriting the instance of the first memory pointer; and otherwise, leaving, via hardware, the second memory pointer and the third memory pointer unchanged, which associates the instance of the lower word with the immediately preceding stored instance of the upper word.

17. The method of claim 16, wherein the method further comprises parsing the data entries into instances of higher words and instances of lower words based on the word length.

18. The method of claim 16, wherein the first memory queue includes a first FIFO;

wherein the second memory queue includes a second FIFO; and wherein the third memory queue includes a third FIFO.

19. The method of claim 16, wherein the word length maximizes compression of the data entries.

20. The method of claim 16, wherein instances of the higher word and the lower word are stored in the data buffer for each clock cycle.

* * * * *

UNITED STATES PATENT AND TRADEMARK OFFICE
CERTIFICATE OF CORRECTION

PATENT NO. : 10,007,485 B2  
APPLICATION NO. : 14/993879  
DATED : June 26, 2018  
INVENTOR(S) : Peters et al.

Page 1 of 1

It is certified that error appears in the above-identified patent and that said Letters Patent is hereby corrected as shown below:

In the Specification

In Column 4, Line 34, after "word" insert -- . --.

In Column 6, Line 67, after "value)" insert -- . --.

Signed and Sealed this  
Second Day of April, 2019

Andrei Iancu  
*Director of the United States Patent and Trademark Office*